Dec. 29, 1953 T. SCHMIDT 2,664,219
STORAGE AND UTILITY BOX
Filed Oct. 23, 1952 2 Sheets-Sheet 1

Inventor:
Thur Schmidt
By: L. F. Hammond.
Attorney.

Dec. 29, 1953          T. SCHMIDT          2,664,219
STORAGE AND UTILITY BOX
Filed Oct. 23, 1952          2 Sheets-Sheet 2
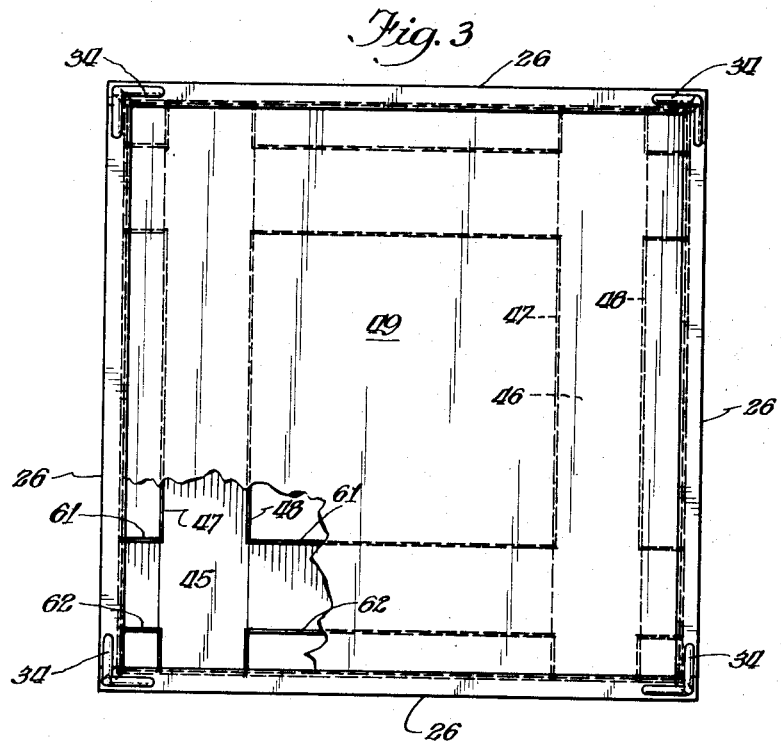
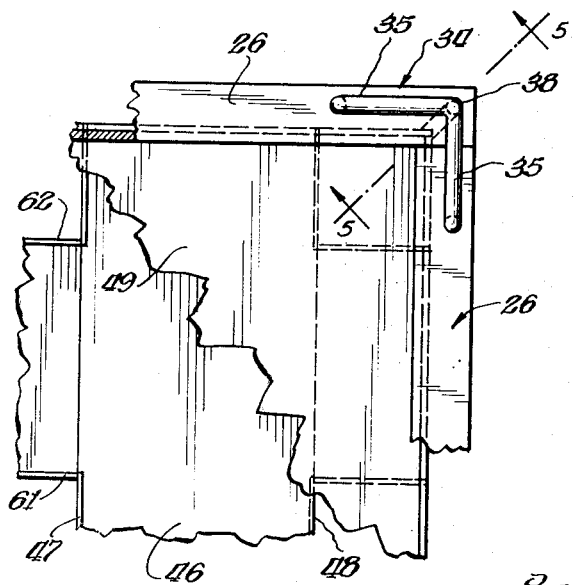
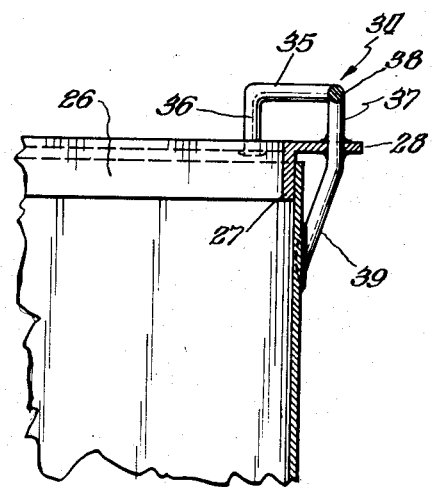
Inventor:
Thur Schmidt
By: L. F. Hammand.
Attorney.

Patented Dec. 29, 1953

2,664,219

UNITED STATES PATENT OFFICE 2,664,219

STORAGE AND UTILITY BOX

Thur Schmidt, Chicago, Ill.

Application October 23, 1952, Serial No. 316,345

3 Claims. (Cl. 220—1.5)

This invention relates to material handling equipment, and particularly to equipment designed for expeditious handling of articles of manufacture in and about factory premises during the various manufacturing processes. The embodiment of the invention here illustrated is suited to many and various articles, but is particularly well adapted to handling irregularly shaped castings or other heavy metal parts.

The problems incident to efficient handling of materials in manufacturing plants are of long standing and have for many years taxed the ingenuity of all manufacturers, particularly those engaged in making or processing heavy and irregularly shaped parts such as sand or die castings, large stampings, etc. The seriousness of the problem has increased with the increasing efficiency of modern production machinery, since the greater the potential production of a machine, the greater its requirements for adequate means to bring raw material to it and to dispose of the finished products, as well as to dispose of the scrap produced by the manufacturing operations. This situation has developed until at the present time many high production machines fail to attain their actual maximum rate of production solely for the reason that the means available to transfer material to and from a given machine are inadequate to match its capacity of production. This is a serious matter from an economic standpoint and represents a considerable monetary loss if not remedied.

It is, therefore, the primary object of the present invention to provide a novel parts receptacle or container, characterized by a unique structure such that it may be handled by a conventional fork tine lift truck, yet when so handled may be picked up, moved and shifted from place to place much more easily, quickly and conveniently than possible with other types of receptacles.

It is a further object of the invention to provide a box or container of the improved construction mentioned above, wherein the boxes are so designed that they fit together when stacked on each other, and interlock with each other in such a manner that they may be stacked several boxes high even when fully loaded, yet will rest in a stable condition without tendency toward tipping or unbalance. Thus a multiplicity of such boxes may be employed for temporary parts storage during manufacture without additional loading or unloading operations. It follows that by the present teaching, parts may be stored in a manner requiring a minimum of storage space, yet so that they are instantly available as the needs of production require.

It is another object of the invention to provide a stacking, storage and utility box as described above, including means whereby the boxes may be conveniently handled by a crane or chain hoist as well as by a lift truck, so that they will be susceptible to easy handling when loading from wharves, shipping docks, etc., or in any instance in which the use of a fork lift truck is inadvisable or inconvenient.

The foregoing objects are accomplished according to the present teaching by the provision of a multiplicity of relatively heavy, square steel boxes which, in the preferred form of the invention, are about 48 inches wide, 48 inches long and 48 inches deep, and are formed of heavy reinforced sheet steel, having handles at their upper corners shaped to interlock with the corners of another box when stacked, and a pair of fork tine ports on each side of the box so that the box may be quickly and conveniently lifted by a lift truck approaching from any one of its four sides.

The manner in which the present teachings are put into commercial practice will be best explained in connection with the drawings of this specification, wherein:

Figure 3 is a plan view thereof, a portion of the bottom of the box being broken into section to illustrate the channel frame members thereunder;

Figure 4 is a fragmentary detail plan view of one of the uppermost corners of the box, showing the configuration of the interlocking hoisting handle;

Figure 5 is a detail sectional view through the upper rim of the box, the view being taken substantially on the plane of the line 5—5 of Figure 4.

Figure 1:
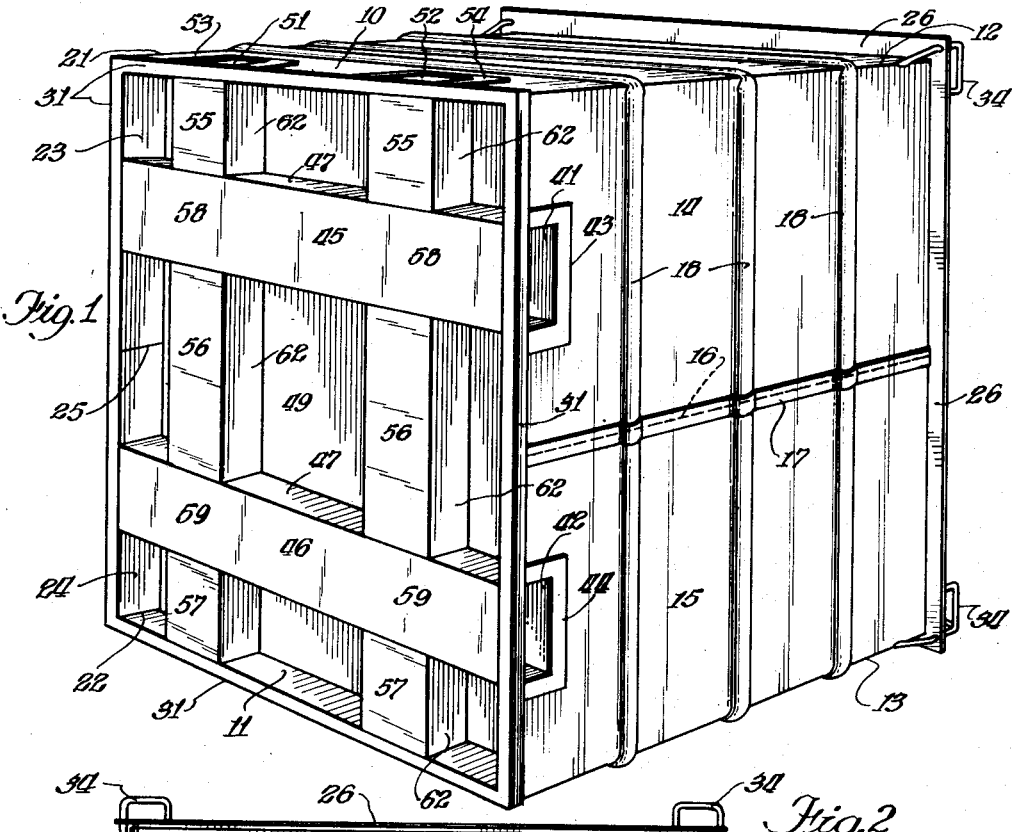
Figure 1 is a perspective view of a storage and utility box constructed in accordance with the present teaching, the box being shown as resting on its side to illustrate the cross beam construction of the bottom frame thereof.
Figure 2:
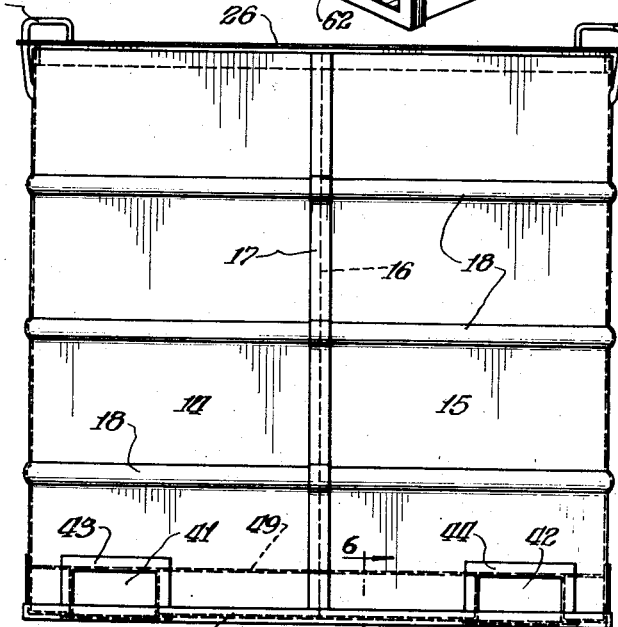
Figure 2 is a side elevational view of a box of the type illustrated in Figure 1.
Figure 6:
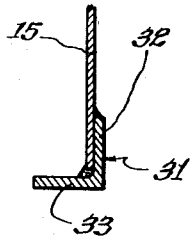
Figure 6 is a detail sectional view through the lower rim of the box, the view being taken substantially on the plane of the line 6—6 of Figure 2.

By the present teachings the boxes are formed of two substantially identical and opposite halves, each comprising a sheet steel plate forming one side of the box and folded to form the box corners. The sheets extend beyond the corners, however, and are drawn inwardly toward each other from the corners so that they meet along opposite center seams to form the other two sides of the box. For example, in Figure 1 the sides 10 and 11 are each folded at the corners 12 and 13 to form half sides 14 and 15 which may be joined along the seam 16 and, if desired, covered by a welded reinforcing strip 17. Additional reinforcement may be provided by rolled beads 18, which may extend entirely around the box. The sheets 10 and 11 are also bent around the rearward corners 21 and 22 to form portions 23 and 24 which meet at the seam 25. This seam may also be covered by a reinforcing strip similar to the strip 17. The uppermost edges of the open end of the box are reinforced by four angle irons 26, which have their downwardly extended flanges 27 welded to the inside of the side walls of the box, and their horizontal flanges 28 projecting outwardly considerably beyond the plane of the box walls (Figure 5). The lowermost edges of each wall of the box are reinforced by angle irons 31, which have their vertical flanges 32 welded to the outside of the side walls and their horizontal flanges 33 extending inwardly therefrom (Figure 6).

Lifting and stacking handles 34 are provided at each corner of the box, as shown in detail in Figures 4 and 5. Each of these handles comprises an L-shaped rod having its opposite legs 35 positioned at 90° to each other and bent downwardly at their ends 36, which are welded to the horizontal flanges 28 of the top angle irons. A center reinforcing rod 37 is welded to the rod 34 at 38 and extends down through the horizontal flange 28 of the angle iron to terminate in an inclined portion 39 extending inwardly toward the side wall of the box and welded to the side wall at the corner thereof.

Near the bottom of the wall sections 14 and 15 of the box, the sheet metal of the walls is cut away to form a pair of fork tine ports 41 and 42, around which marginal reinforcing members 43 and 44 are welded. The ports 41 and 42 are interconnected with identical ports on the opposite side walls 23 and 24 by transverse frame members 45 and 46. Each of these is of channel shape, having a flat bottom wall with vertical side walls 47 and 48 extending upwardly from the bottom to a flat, horizontal metal sheet or plate 49 which forms the bottom surface of the box. The side wall 10 is provided with ports 51 and 52 which are identical with the ports 41 and 42, and are similarly reinforced by metal frames 53 and 54. Transverse frame members extend from the ports 51 and 52 to identical ports on the opposite side 11. This pair of frame members each comprises three sections 55, 56 and 57, interconnecting the frame member 45 at junctions 58, and intersecting the frame member 46 at junctions 59. All of these channels have vertical side walls 61 and 62 which intersect and are welded to the walls 47 and 48 in the manner seen in Figures 3 and 4. The walls 47 and 48 are cut away between the side walls of the intersecting channels so that the fork tine of a lift truck can be inserted in any one of the ports and can be extended well under the box in a position to adequately support the load therein.

It is to be noted, however, that the channels are entirely closed except for the end ports, and that the operator of the fork lift truck can insert the tines therein under any and all conditions without interference from material contained by the boxes, or irregularities of the surface on which the boxes are resting at the moment. This is of particular advantage in applications wherein the boxes are to be stacked in multiple tiers, since there is no possibility of parts being piled high enough in one box to extend upwardly and obstruct the ports of the box supported on it in a manner to interfere with the free and proper operation of the lift truck in inserting the fork in the channels.

From the above, it will be seen that by the present teaching the applicant has provided a box of novel physical construction, which has unusual usefulness and great utility in facilitating the handling of materials as in manufacturing operations. The inside of the box is smooth and free of obstructions so that it may be easily cleaned and will afford the maximum cubic capacity possible. It is nevertheless provided with means whereby it may be picked up from any surface by a conventional lift truck, and provided with interlocking handles so designed that they not only serve to hold the boxes in proper alignment when they are stacked in multiple tiers, but also of such design that they may serve as lifts when the boxes are to be handled by a chain hoist or crane. The angled portion 39 of the handle is adequate to resist any tendency to bend the handles during loading or unloading, and thus provides adequate reinforcement for the portions 35 of the handle which serve to interlock each box with the one above it when they are stacked. It follows that by the present teachings it is entirely feasible to utilize a number of boxes stacked one above the other. It is even practicable to lift the boxes when in stacked condition. Thus, a lift truck that has vertical movement limited to the height of two boxes, for example, may lift another pair upwardly and stack them thereon so that a total height of four or more tiers is attained and the maximum storage capacity of any given space is utilized.

Having thus described my invention, what I claim as new and desire to secure by United States Letters Patent is:

1. A storage and utility box comprising, in combination, a bottom member consisting of a flat plate and four transverse frame members secured thereunder; said frame members being arranged in parallel pairs spaced apart from each other and intersecting at four junctions within the box; each of said frame members comprising a flat bottomed channel with upstanding side walls secured to the under side of the bottom plate; said side walls of the channels being interrupted at the said junctions to provide open ducts through both pairs of frame channels; together with four side walls of the box surrounding said bottom and perpendicular thereto, said side walls each having an upper reinforcing rim and a lower reinforcing rim extending therearound, with a pair of fork tine ports in each wall adjacent the lower edge thereof in opposite pairs on the opposite sides of the box and in registry with the opposite ends of each pair of said bottom frame channels.

2. A storage and utility box comprising, in combination, a bottom member including four transverse frame members; said frame members being arranged in parallel pairs spaced apart from each other and intersecting at four junctions within the box; each of said frame members comprising a channel with vertical side walls interrupted at the said junctions to provide open ducts through both pairs of frame channels; together with four side walls of the box surrounding said bottom and perpendicular thereto, with a pair of fork tine ports adjacent the lower edge of each wall in opposite pairs on the opposite sides of the box and in registry with the opposite ends of each pair of said bottom frame channels.

3. A storage and utility box comprising, in combination, four substantially vertical walls and a bottom member consisting of a flat plate and four transverse frame members secured thereto; said frame members being arranged in parallel pairs spaced apart from each other and crossing the other pair within the box; each of said frame members comprising a channel beam with vertical side walls to provide open ducts through the box in two directions; with a pair of fork tine ports entering said ducts adjacent the lower edge of each of said walls.

THUR SCHMIDT.

References Cited in the file of this patent

UNITED STATES PATENTS

| Number | Name | Date |
|---|---|---|
| 586,122 | Gale | July 13, 1897 |
| 825,133 | Klenk | July 3, 1906 |
| 1,385,602 | Bentley | July 26, 1921 |
| 2,369,944 | Cahners | Feb. 20, 1945 |
| 2,468,026 | Boone | Apr. 26, 1949 |
| 2,479,728 | Darling | Aug. 23, 1949 |
| 2,503,562 | Porter | Apr. 11, 1950 |
| 2,626,076 | Hole | Jan. 20, 1953 |

FOREIGN PATENTS

| Number | Country | Date |
|---|---|---|
| 532,165 | France | Nov. 9, 1921 |